United States Patent
Inoue et al.

(10) Patent No.: US 9,128,831 B2
(45) Date of Patent: Sep. 8, 2015

(54) ELECTRICAL DEVICE AND METHOD OF SETTING ADDRESS

(71) Applicant: LAPIS SEMICONDUCTOR CO., LTD., Kanagawa (JP)

(72) Inventors: Kazutoshi Inoue, Kanagawa (JP); Yoshikatsu Matsuo, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 14/016,747

(22) Filed: Sep. 3, 2013

(65) Prior Publication Data

US 2014/0068108 A1 Mar. 6, 2014

(30) Foreign Application Priority Data

Sep. 4, 2012 (JP) .................................. 2012-194284

(51) Int. Cl.
*G06F 3/00* (2006.01)
*G06F 12/06* (2006.01)
*G06F 13/42* (2006.01)

(52) U.S. Cl.
CPC ........ *G06F 12/0653* (2013.01); *G06F 13/4247* (2013.01); *G06F 12/0669* (2013.01)

(58) Field of Classification Search
CPC ............ G06F 12/0653; G06F 12/0669; G06F 13/4247
See application file for complete search history.

(56) References Cited

U.S. PATENT DOCUMENTS

| | | | | |
|---|---|---|---|---|
| 5,404,460 A | * | 4/1995 | Thomsen et al. | 710/9 |
| 5,539,390 A | * | 7/1996 | Nagano et al. | 340/9.16 |
| 6,928,501 B2 | * | 8/2005 | Andreas et al. | 710/110 |
| 7,627,711 B2 | * | 12/2009 | Bartley et al. | 711/5 |
| 8,645,580 B2 | * | 2/2014 | Koudar | 710/3 |
| 2007/0165457 A1 | * | 7/2007 | Kim | 365/185.11 |
| 2007/0233919 A1 | * | 10/2007 | Miura | 710/110 |
| 2008/0080492 A1 | * | 4/2008 | Pyeon et al. | 370/389 |
| 2009/0144471 A1 | * | 6/2009 | Lin | 710/110 |

FOREIGN PATENT DOCUMENTS

| | | |
|---|---|---|
| JP | 05-101004 A | 4/1993 |
| JP | 07-105121 A | 4/1995 |
| JP | 2001-031028 A | 2/2001 |

* cited by examiner

*Primary Examiner* — Jing-Yih Shyu

(74) *Attorney, Agent, or Firm* — Kubotera & Associates, LLC

(57) ABSTRACT

An electrical device includes a plurality of apparatus connected with a daisy chain connection through a communication line so that the apparatus communicate with each other through the communication line; and a control unit connected to one of the apparatus at an end stage thereof so that the control unit is configured to communicate with the one of the apparatus. The apparatus includes an address setting unit for setting a specific number to an address of the apparatus according to an address setting command when the apparatus receives address setting data including an address addition instruction as the address setting command for adding the specific number to the address of the apparatus. The apparatus further includes an address setting data transmission control unit for outputting the address setting data to a later stage apparatus when the address setting unit sets the specific value to the address of the apparatus.

8 Claims, 8 Drawing Sheets

ELECTRICAL DEVICE AND METHOD OF SETTING ADDRESS

BACKGROUND OF THE INVENTION AND RELATED ART STATEMENT

The present invention relates to an electrical device including a plurality of apparatus and a method of setting an address of each of the apparatus. More specifically, the present invention relates to an electrical device including a plurality of apparatus connected with a daisy chain connection through a communication line, and a method of setting an address of each of the apparatus.

A conventional electrical device includes a plurality of conventional apparatus connected with a daisy chain connection through a communication line. There have been proposed several conventional methods for setting an address of each of the conventional apparatus of the convention electrical device.

For example, in the conventional method disclosed in Patent References 1 to 3, when an address is set to each of the conventional apparatus connected with the daisy chain connection, it is configured such that an address number received thereto or an address number with a specific value added thereto is set as an address number of the conventional apparatus its self. Then, a specific value is added to the address number thus received to generate a new address number, so that the new address number is transmitted to a conventional apparatus at a later stage.

Patent Reference 1: Japanese Patent Publication No. 05-101004
Patent Reference 2: Japanese Patent Publication No. 07-105121
Patent Reference 3: Japanese Patent Publication No. 2001-31028

In the conventional electric device and the conventional method of setting an address, there are the following problems. Firstly, in setting a new address, when the new address number is generated in the conventional apparatus and transmitted to the conventional apparatus at the later stage, there has been known a conventional technique, in which data for checking reliability such as CRC (Cyclic Redundancy Check) and the like is generated. Then, the data are added to the newly generated address number, so that reliability of the address number can be checked in the conventional apparatus at the later stage. In the convention technique described above, however, it is necessary to generate the data for checking reliability every time when the address number is generated. Accordingly, it is necessary to take a long period of time for setting the addresses of the conventional apparatus in the convention electric device.

Secondly, in order to shorten the period of time for generating the data for checking reliability, there has been a technique, in which the data for checking reliability are assigned to the address numbers most likely generated, so that the data for checking reliability are prepared as table data. In the convention technique described above, however, an amount of the data for checking reliability to be prepared tends to increase as the number of the conventional apparatus whose addresses to be set increases. Accordingly, it is necessary to install a large capacity memory in the conventional electric device upon manufacturing, or to design the convention electric device capable of connecting a wide range number of the conventional apparatus. In this case, the number of the data for checking reliability, which can be stored in the electric device, is dependent on the memory capacity. As a result, the number of the conventional apparatus capable of being connected to the conventional electric device is restricted with the memory capacity.

In view of the problems described above, an object of the present invention is to provide an electrical device and a method of setting an address capable of solving the problems of the conventional electrical device. In the electrical device and the method of setting an address of the present invention, it is possible to alleviate the restriction in the number of the apparatus capable of being disposed in the electric device while preventing the period of time for setting the address from increasing.

Further objects and advantages of the invention will be apparent from the following description of the invention.

SUMMARY OF THE INVENTION

In order to attain the objects described above, according to a first aspect of the present invention, an electrical device includes a plurality of apparatus connected with a daisy chain connection through a communication line so that the apparatus communicate with each other through the communication line, and a control unit connected to one of the apparatus at an end stage thereof so that the control unit is configured to communicate with the one of the apparatus. The electric device is configured to add reliability check data to communication data so that the electric device performs data communication.

According to the first aspect of the present invention, each of the apparatus includes an address setting unit for setting a specific number to an address of the apparatus its self according to an address setting command when each of the apparatus receives data, and the data are address setting data includes an address addition instruction as the address setting command for adding a specific number to the address of the apparatus its self.

According to the first aspect of the present invention, each of the apparatus further includes an address setting data transmission control unit for outputting the address setting data including the address addition instruction as the address setting command defined in the apparatus its self to one of the apparatus at a later stage capable of transmitting when the address setting unit sets the specific value to the address of the apparatus its self.

According to a second aspect of the present invention, an electrical device includes a plurality of apparatus connected with a daisy chain connection through a communication line so that the apparatus communicate with each other through the communication line, and a control unit connected to one of the apparatus at an end stage thereof so that the control unit is configured to communicate with the one of the apparatus. The electric device is configured to add reliability check data to communication data so that the electric device performs data communication. A method of the present invention is for setting an address of each of the apparatus of the electric device.

According to the second aspect of the present invention, each of the apparatus is configured to perform a step of confirming reliability of data received thereto with the reliability check data.

According to the second aspect of the present invention, each of the apparatus is configured to further perform a step of setting a specific number to an address of the apparatus its self according to an address setting command when the data thus received satisfies a specific standard with respect to reliability, and the data thus received are address setting data including an address addition instruction as the address setting command for adding a specific number of the address of the apparatus its self.

According to the second aspect of the present invention, each of the apparatus is configured to further perform a step of transmitting the address setting data including the address addition command as the address setting command defined in the apparatus its self to one of the apparatus at a later stage when the specific value is set to the address of the apparatus its self.

In the electrical device and the method of setting the address of the present invention, it is possible to alleviate the restriction in the number of the apparatus capable of being disposed in the electric device while preventing the period of time for setting the address from increasing.

DETAILED DESCRIPTION OF PREFERRED EMBODIMENTS

Hereunder, preferred embodiments of the present invention will be explained with reference to the accompanying drawings. It should be noted that the present invention is not limited to the embodiments, and is capable of being modified in various ways within a scope of the present invention.

First Embodiment

Figure 1:
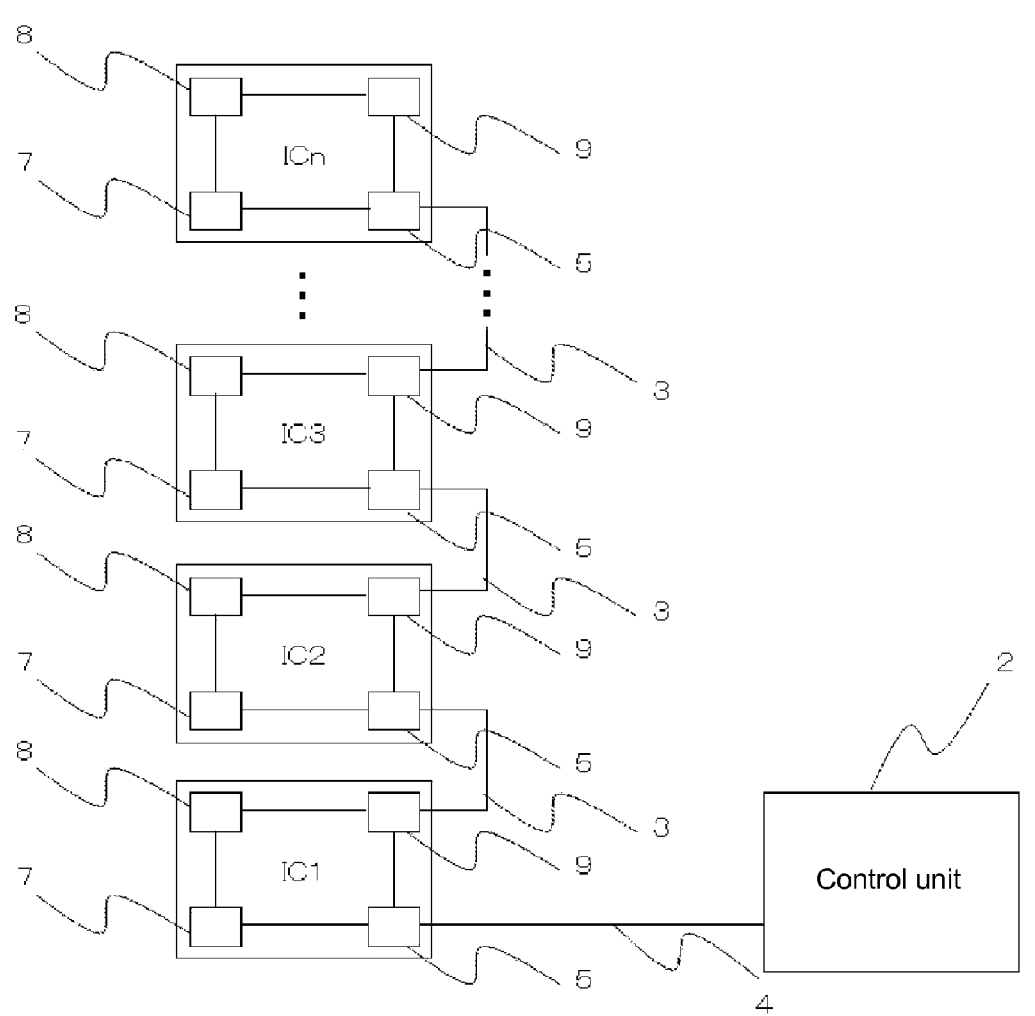
FIG. 1 is a block diagram showing a configuration of an electrical device including a plurality of apparatus according to a first embodiment of the present invention.

A first embodiment of the present invention will be explained with reference to FIGS. 1 to 4. FIG. 1 is a block diagram showing a configuration of an electrical device 1 including a plurality of apparatus IC1 to ICn according to the first embodiment of the present invention.

As shown in FIG. 1, the electrical device 1 includes a plurality of apparatus IC1 to ICn and a control unit 2. The apparatus IC1 to ICn are connected with a daisy chain connection, in which adjacent apparatus are connected to each other through a communication line 3, so that the adjacent apparatus are capable of communicating with each other through the communication line 3. In the electrical device 1, the control unit 2 and the apparatus IC1 to ICn are configured to perform data communication using data including reliability check data for checking reliability such as whether data damage occurs and the like due to the data communication. The control unit 2 is connected to the apparatus IC1 through a communication line 4. The apparatus IC1 is disposed as an end of the apparatus connected with the daisy chain connection. Alternatively, the control unit 2 may connected to the apparatus ICn as the other end of the apparatus connected with the daisy chain connection.

In the first embodiment, the control unit 2 includes a CPU (Central Processing Unit), a memory, and the like, and is configured to be capable of controlling the apparatus IC1 to ICn through the communication line 4. Further, the control unit 2 is configured to generate address setting data including an address setting command for setting an address of each of the apparatus IC1 to ICn, or to retrieve the address setting data from a memory so that the control unit 2 transmits the address setting data to the apparatus IC1.

In the first embodiment, if necessary, the control unit 2 may be configured to generate address initial value setting data including an address initial value setting command for setting an initial value of an address of each of the apparatus IC1 to ICn, or to retrieve the address initial value setting data from a memory so that the control unit 2 transmits the address initial value setting data to the apparatus IC1.

In the first embodiment, the address setting data includes at least the address setting command and the reliability check data for checking reliability of the address setting command. It should be noted that the address setting data may include other data in addition to the address setting command and the reliability check data. In this case, the reliability check data may be data for checking reliability of other data relative to the address setting command.

In the first embodiment, the address initial value setting data includes at least the address initial value setting command and the reliability check data for checking reliability of the address initial value setting command. It should be noted that the address initial value setting data may include other data in addition to the address setting command and the reliability check data. In this case, the reliability check data may be data for checking reliability of other data relative to the address initial value setting command.

As shown in FIG. 1, each of the apparatus IC1 to ICn includes a transmission reception unit 5 as a first transmission reception unit; an address setting unit 7; an address setting data transmission control unit 8; and a transmission reception unit 9 as a first transmission reception unit. Accordingly, it is possible to perform the data communication between the apparatus IC1 to ICn connected each other through the communication line 3.

In the first embodiment, the transmission reception unit 5 is electrically connected to the communication line 3 and the communication line 4, so that the transmission reception unit 5 is capable of receiving data transmitted from outside to each of the apparatus IC1 to ICn through the communication line 3 or the communication line 4. Further, the transmission reception unit 5 may be configured to transmit data to outside from the apparatus IC1 to ICn through the communication line 3 or the communication line 4.

Figure 2:
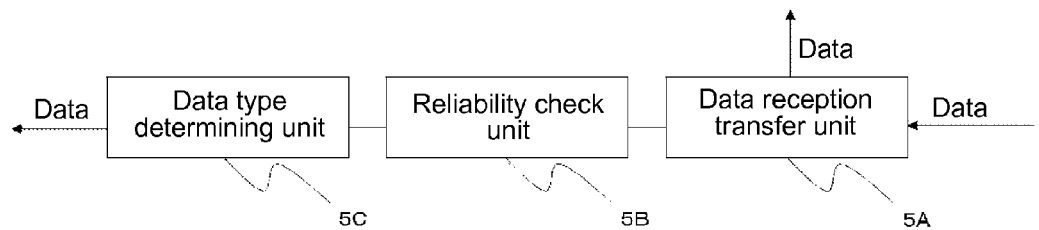
FIG. 2 is a block diagram showing a configuration of a transmission reception unit of each of the apparatus of the electrical device according to the first embodiment of the present invention.

FIG. 2 a block diagram showing a configuration of the transmission reception unit 5 of each of the apparatus IC1 to ICn of the electrical device 1 according to the first embodiment of the present invention. As shown in FIG. 2, the transmission reception unit 5 includes a data reception transfer unit 5A; a reliability check unit 5B; and a data type determining unit 5C.

In the first embodiment, the data reception transfer unit 5A is configured to transfer the data received from outside per bit to the reliability check unit 5B and other circuits of the apparatus where the data reception transfer unit 5A is disposed. The reliability check unit 5B is configured to confirm whether the reliability of the data thus received satisfies a standard set in advance according to the reliability check data included in the data thus received. It should be noted that the reliability check unit 5B confirms whether the reliability of the data thus received satisfies the standard set in advance after the reliability check unit 5B receives a whole package of data, that is, one packet, including at least the reliability check data and the data thus received and transferred from the data reception transfer unit 5A such as a command and the like.

In the first embodiment, the data type determining unit 5C is configured to determine the type of the data thus received when the reliability of the data thus received satisfies the standard. Further, the data type determining unit 5C is configured to perform a process of distributing the data thus received to each function of the apparatus, so that an appropriate process is performed on the data thus received.

In the first embodiment, the address setting unit 7 has a function of setting a specific value relative to an address of the apparatus where the address setting unit 7 is disposed according to the address setting command when the data thus received are the address setting data including the address setting command. It should be noted that the address setting command of the address setting data includes an address addition instruction for adding the specific value to the address of the apparatus, an address setting instruction for setting the specific value to the address of the apparatus.

Figure 3:
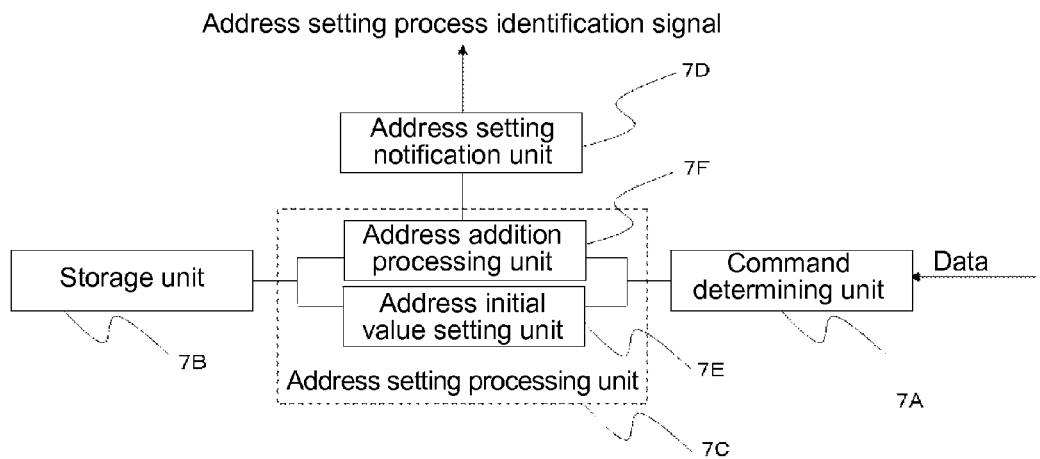
FIG. 3 is a block diagram showing a configuration of an address setting unit of each of the apparatus of the electrical device according to the first embodiment of the present invention.

FIG. 3 a block diagram showing a configuration of the address setting unit 7 of each of the apparatus IC1 to ICn of the electrical device 1 according to the first embodiment of the present invention. As shown in FIG. 3, the address setting unit 7 includes a command determining unit 7A; a storage unit 7B; an address setting processing unit 7C; and an address setting notification unit 7D. Further, the address setting unit 7 is electrically connected to the transmission reception unit 5.

In the first embodiment, the command determining unit 7A is configured to determine whether the data thus received are the address initial value setting data or the address setting data when the address setting unit 7 receives the data output from the transmission reception unit 5. The storage unit 7B is formed of a memory. The address setting processing unit 7C includes an address initial value setting unit 7E and an address addition processing unit 7F.

In the first embodiment, the address initial value setting unit 7E is configured to set an address as the initial value of the address relative to the storage unit 7B according to the address initial value setting command when the command determining unit 7A determines that the data thus received include the address initial value setting command and are the address initial value setting data. The address addition processing unit 7F is configured to set an address of the storage unit 7B according to the address setting command when the command determining unit 7A determines that the data thus received include the address setting command and the address setting data.

In the first embodiment, when the address addition processing unit 7F sets the address relative to the storage unit 7B, the address addition processing unit 7F performs the addition process of the initial value to the address stored in the storage unit 7B. When the address addition processing unit 7F sets the address relative to the storage unit 7B, the address setting notification unit 7D is configured to output an address setting process identification signal capable of identifying that the address is set. It should be noted that a minus value may be added in the addition process.

In the first embodiment, when the address setting unit 7 sets the specific value relative to the address of the apparatus where the address setting unit 7 is disposed, the address setting data transmission control unit 8 is configured to output the address setting data to be capable of transmitting to the apparatus at a later stage of the apparatus where the address setting data transmission control unit 8 is disposed. In this case, the address setting data include the address addition instruction as the address setting command, so that the specific value is added to the address of the apparatus defined in advance in the apparatus where the address setting data transmission control unit 8 is disposed.

Figure 4:
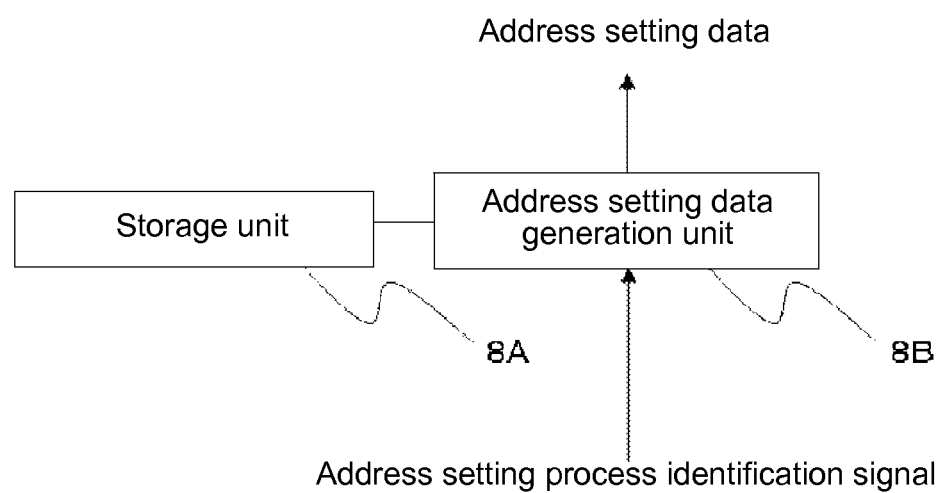
FIG. 4 is a block diagram showing a configuration of an address setting data transmission control unit of each of the apparatus of the electrical device according to the first embodiment of the present invention.

FIG. 4 a block diagram showing a configuration of the address setting data transmission control unit 8 of each of the apparatus IC1 to ICn of the electrical device 1 according to the first embodiment of the present invention. As shown in FIG. 4, the address setting data transmission control unit 8 includes a storage unit 8A and an address setting data generation unit 8B. The storage unit 8A is formed of a memory for storing the address setting data in advance.

In the first embodiment, the address setting data is formed of at least the address setting command and the reliability check data for checking the reliability of the address setting command. It should be noted that the address setting data may include other data in addition to the address setting command and the reliability check data. In this case, the reliability check data are data for checking the reliability of the address setting command and the other data.

In the first embodiment, when the address setting data generation unit 8B receives the address setting process identification signal output from the address setting unit 7, the address setting data generation unit 8B is configured to retrieve the address setting data from the storage unit 8A, so that the address setting data generation unit 8B outputs the address setting data. It should be noted that the address setting command of the address setting data stored in the storage unit 8A may include the address setting command similar to that of the address setting data transmitted from the control unit 2. Alternatively, the address setting command of the address setting data may include a different address setting command.

In the first embodiment, it is preferred that the number of types of the address setting data to be stored in the storage unit 8A of the apparatus is as small as possible, less than the number of the apparatus IC1 to ICn of the electrical device 1. More preferably, just one type is most preferred. When the number of types of the address setting data to be stored in the storage unit 8A of the apparatus is as small as possible, it is possible to reduce a memory capacity and an area of the storage unit 8A, thereby reducing an area of the electrical device 1.

In the first embodiment, the address setting data stored in the storage unit 8A may include the address setting command and the reliability check data separately. In this case, the address setting command and the reliability check data are stored in the storage unit 8A separately, and the address setting data generation unit 8B is configured to combine the address setting command and the reliability check data to newly generate the address setting data.

In the first embodiment, the transmission reception unit 9 is electrically connected to the communication line 3, the transmission reception unit 5, and the address setting data transmission control unit 8, so that the transmission reception unit 9 is capable of transmitting the data per bit externally from inside each of the apparatus IC1 to ICn through the communication line 3. Further, the transmission reception unit 9 may include a first terminal for inputting the data output from the transmission reception unit 5 and a second terminal for inputting the data output from the address setting data transmission control unit 8, so that the data input through the second terminal is preferably transmitted relative to the data input through the first terminal.

In the first embodiment, as described above, it may be configured such that the data input through the second terminal is preferably transmitted relative to the data input through the first terminal. More specifically, when the data are input to the first terminal while the data input through the second terminal are processed, the data input through the first terminal are discarded. When the data are input to the second terminal while the data input through the first terminal are processed, the data input through the first terminal stop being processed and are discarded, and the data input through the second terminal starts being processed. It should be noted that the electrical device 1 may include an additional function of receiving data input to each of the apparatus IC1 to ICn from outside through the communication line 3.

An operation of the electrical device 1 in an address setting process will be explained next. First, when the electrical device 1 is turned on to power up each unit thereof to be in an operable state, the electrical device 1 performs a process of setting the initial value in the address of each of the apparatus IC1 to ICn.

More specifically, the control unit 2 transmits the address initial value setting data to the apparatus IC1 through the communication line 4. The address initial value setting data includes, for example, the address initial value setting command and the reliability check data of the address initial value setting command (Cyclic Redundancy Check, CRC). The address initial value setting command may be integrally formed of, for example, information indicating that the address initial value setting command is the command for setting the address and the address setting instruction, that is, the instruction for setting the specific value to the initial value of the address. In the first embodiment, it is supposed that the specific value is set to "0", and the specific value is not limited thereto.

In the next step, when the apparatus IC1 receives the address initial value setting data at the transmission reception unit 5 thereof, the reliability check unit 5B confirms the reliability of the address initial value setting data thus received. When the data reception transfer unit 5A determines that the reliability of the address initial value setting data satisfies the standard, the data type determining unit 5C determines that the address initial value setting data is the data for setting the address, so that the data type determining unit 5C transmits the address initial value setting data to the address setting unit 7.

In the next step, when the address setting unit 7 receives the address initial value setting data, the command determining unit 7A determines that the data thus received are the address initial value setting data. Accordingly, the address initial value setting unit 7E sets the initial value of the address relative to the storage unit 7B. In the first embodiment, according to the address initial value setting data, the initial value of the address is set to "0".

In the first embodiment, when the transmission reception unit 5 receives the address initial value setting data, the transmission reception unit 5 distributes the address initial value setting data to the address setting unit 7 after the specific process described above. At the same time, the transmission reception unit 5 outputs the address initial value setting data to the transmission reception unit 9. When the transmission reception unit 9 receives the address initial value setting data, the transmission reception unit 9 performs the process of transmitting the address initial value setting data to the apparatus IC2 through the communication line 3.

In the next step, when the apparatus IC2 receives the address initial value setting data from the apparatus IC1, similar to the apparatus IC1, the apparatus IC2 confirms the reliability of the address initial value setting data. When it is determined that the reliability of the address initial value setting data satisfies the standard, the address of the apparatus IC2 is set as "0" in the address setting unit 7b according to the address initial value setting command.

Further, similar to the apparatus IC1, the transmission reception unit 5 of the apparatus IC2 distributes the address initial value setting data to the address setting unit 7 after the specific process described above. At the same time, the transmission reception unit 5 outputs the address initial value setting data to the transmission reception unit 9. When the transmission reception unit 9 receives the address initial value setting data, the transmission reception unit 9 performs the process of transmitting the address initial value setting data to the apparatus IC3 through the communication line 3.

In the next step, when the apparatus IC3 receives the address initial value setting data from the apparatus IC2, similar to the apparatus IC1, the apparatus IC3 confirms the reliability of the address initial value setting data. When it is determined that the reliability of the address initial value setting data satisfies the standard, the address of the apparatus IC3 is set as "0" in the address setting unit 7b according to the address initial value setting command.

Further, similar to the apparatus IC1, the transmission reception unit 5 of the apparatus IC3 distributes the address initial value setting data to the address setting unit 7 after the specific process described above. At the same time, the transmission reception unit 5 outputs the address initial value setting data to the transmission reception unit 9. When the transmission reception unit 9 receives the address initial value setting data, the transmission reception unit 9 performs the process of transmitting the address initial value setting data to the apparatus IC4 (not shown) through the communication line 3.

In the first embodiment, through repeating the process described above, each of the apparatus IC1 to ICn sets the initial value of the address thereof according to the address initial value setting data. It may be configured such that a signal indicating that the initial value is set to the address of the apparatus ICn is transmitted from the apparatus ICn to the control unit 2 through the communication line 3 and the communication line 4.

In the next step, the electrical device 1 performs the process of setting the address of each of the apparatus IC1 to ICn.

More specifically, first, the control unit 2 transmits the address setting data to the apparatus IC1 through the communication line 4. The address setting data includes, for example, the address setting command and the reliability check data of the address setting command (Cyclic Redundancy Check, CRC). The address setting command may be integrally formed of, for example, information indicating that the address setting command is the command for setting the address and the address addition instruction, that is, the instruction for adding the specific value to the address. In the first embodiment, it is supposed that the specific value is set to "1", and the specific value is not limited thereto.

An operation of the electrical device 1 in the address setting process relative to each of the apparatus IC1 to Icn will be explained next with reference to FIGS. 5 and 6.

Figure 5:
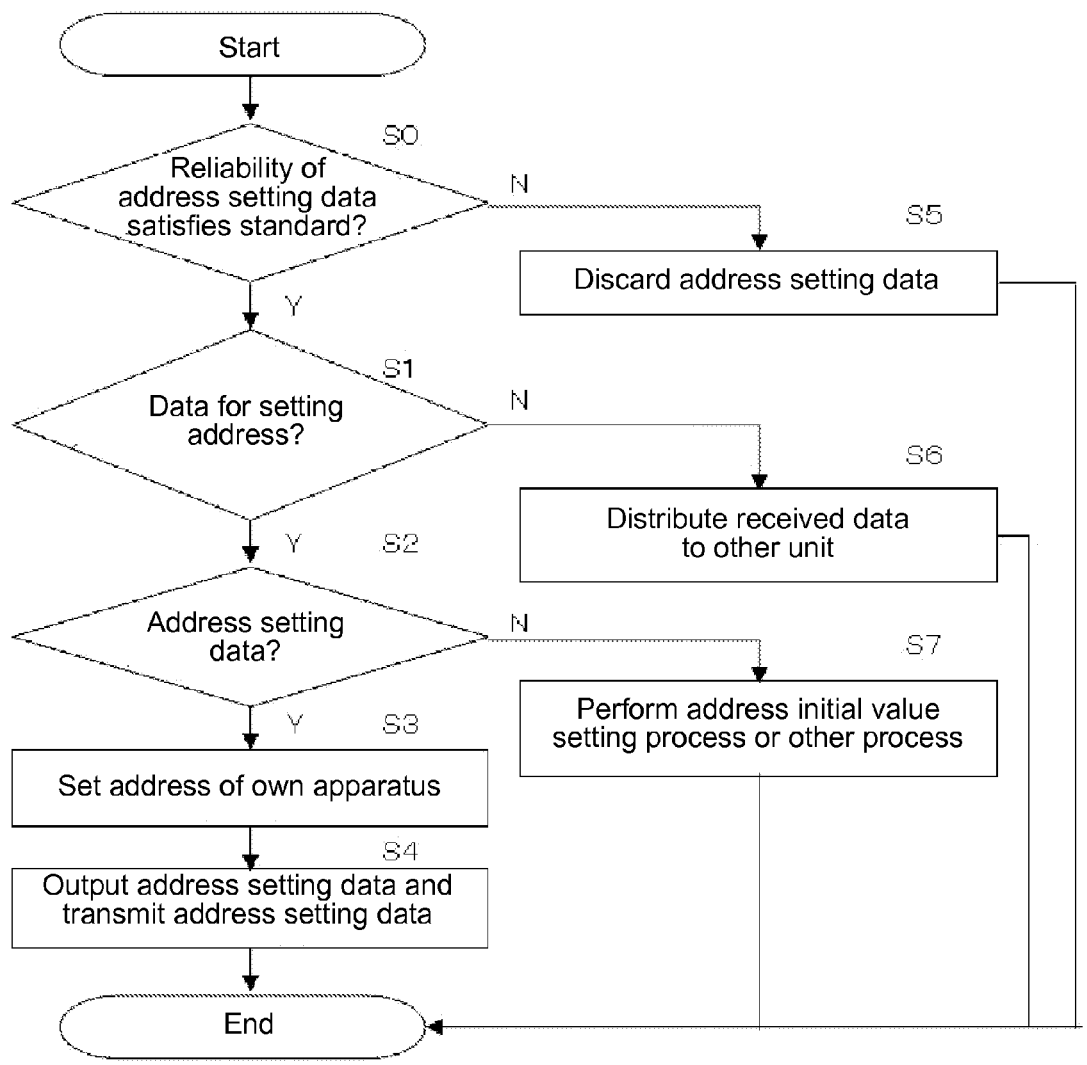
FIG. 5 is a flow chart showing an operation of the electrical device when each of the apparatus performs a process of setting an address according to the first embodiment of the present invention.

FIG. 5 is a flow chart showing the operation of the electrical device 1 when each of the apparatus IC1 to Icn performs the process of setting the address according to the first embodiment of the present invention. FIG. 6 is a time chart showing the operation of the electrical device 1 when each of the apparatus IC1 to Icn performs the process of setting the address according to the first embodiment of the present invention.

Figure 6:
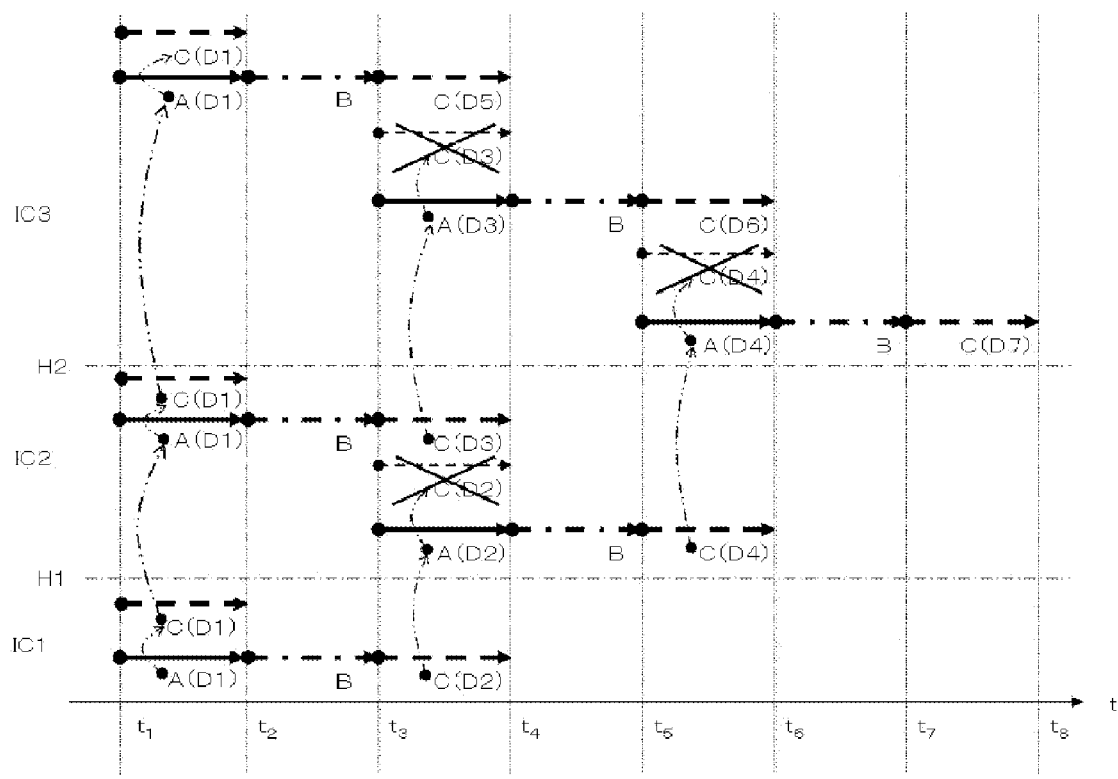
FIG. 6 is a time chart showing the operation of the electrical device when each of the apparatus performs the process of setting the address according to the first embodiment of the present invention.

In FIG. 6, tk (k is a natural number) represents time. Further, A (Dn) represents a period of time from when the data reception transfer unit 5A of the transmission reception unit 5 in each of the apparatus IC1 to ICn starts receiving one of the address setting data Dn to when the reliability check unit 5B completes receiving the one of the address setting data Dn from the data reception transfer unit 5A. It should be noted that the period of time A (Dn) is represented with a solid line arrow with a closed circle as a starting point.

Further, B represents a period of time from when the reliability check unit 5B of the transmission reception unit 5 in each of the apparatus IC1 to ICn completes receiving the one of the address setting data Dn to when the address setting data newly generated with the address setting data transmission control unit 8 according to the address setting data Dn are reached the transmission reception unit 9. It should be noted that the period of time B is represented with a projected line arrow with a closed circle as a starting point. Further, C (Dn) represents a period of time from when the transmission reception unit 9 starts receiving one of the address setting data Dn to when the transmission reception unit 9 completes transmitting the one of the address setting data Dn. It should be noted that the period of time C (Dn) is represented with a hidden line arrow with a closed circle as a starting point.

Further, in a region between the horizontal axis representing the time t and a long hidden line H1 in FIG. 6, the periods of time A (Dn), B, and C (Dn) represent durations of the processes performed in the apparatus IC1. Similarly, in a region between the long hidden line H1 and a long hidden line H2 in FIG. 6, the periods of time A (Dn), B, and C (Dn) represent durations of the processes performed in the apparatus IC2. Similarly, in a region between the long hidden line H2 and a long hidden line H3 in FIG. 6, the periods of time A (Dn), B, and C (Dn) represent durations of the processes performed in the apparatus IC3.

In FIG. 6, when the transmission reception unit 9 does not perform the transmission process of the address setting data described between parentheses of the period of time C (Dn), the hidden line arrow of the period of time C (Dn) is closed out with "X". Further, a long double-dashed hidden line arrow starting from the closed circle indicates that the address setting data processed with the transmission reception unit 5 during the period of time A (Dn) at the starting point are processed with the transmission reception unit 9 during the period of time C (Dn) where the long double-dashed hidden line arrow points, or that the address setting data processed with the transmission reception unit 9 during the period of time C (Dn) at the starting point are processed with the transmission reception unit 5 during the period of time A (Dn) where the long double-dashed hidden line arrow points.

As described above, the data reception transfer unit 5A and the transmission reception unit 9 are capable of outputting the data thus received per bit. Accordingly, as opposed to a period of time when the data reception transfer unit 5A starts receiving the data to when the data reception transfer unit 5A completes receiving the data as one packet, the following period of time becomes very short: that is, from when the data reception transfer unit 5A starts receiving the data to when the reliability check unit 5B starts receiving the data output from the data reception transfer unit 5A; to when the transmission reception unit 9 of one of the apparatus starts receiving the data; and to when the data reception transfer unit 5A of another apparatus at a later stage of the one of the apparatus starts receiving the data.

For the reason described above, in the first embodiment, it is supposed that the data reception transfer unit 5A starts receiving the data; the reliability check unit 5B starts receiving the data; the transmission reception unit 9 starts receiving the data; and the data reception transfer unit 5A of another apparatus at a later stage starts receiving the data simultaneously.

In the first embodiment, at the time t1 in FIG. 6, in the apparatus IC1, the data reception transfer unit 5A starts receiving the address setting data (referred to as the address setting data D1) generated with the control unit 2. At the same time, the data reception transfer unit 5A starts transmitting the address setting data D1 to the reliability check unit 5B per bit. By the time t2, the reliability check unit 5B completes receiving the address setting data D1 during the period of time A (D1).

As shown in the flow chart shown in FIG. 5, in step S0, after the reliability check unit 5B completes receiving the address setting data D1 as the packet, the reliability check unit 5B determines whether the reliability of the address setting data D1 satisfies the standard. In step S1, when the reliability check unit 5B determines that the reliability of the address setting data D1 satisfies the standard, the data type determining unit 5C determines whether the address setting data D1 are the data for setting the address. When the data type determining unit 5C determines that the address setting data D1 are the data for setting the address, the data type determining unit 5C transmits the address setting data D1 to the address setting unit 7.

In step S2, when the address setting unit 7 receives the address setting data D1, the command determining unit 7A determines whether the address setting data D1 thus received are the address setting data. In step S3, when the command determining unit 7A determines that the address setting data D1 thus received are the address setting data, the address addition processing unit 7F of the address setting processing unit 7C performs the process of adding the specific value to the address of the storage unit 7B, so that the address of the own apparatus is set. In this case, the address addition processing unit 7F adds "1" to the address according to the address setting data D1, so that the address of the apparatus IC1 becomes "1". Further, the address setting notification unit 7D outputs the information indicating that the address addition processing unit 7F adds the specific value to the address stored in the storage unit 7B as the address setting process identification signal.

In step S4, when the address setting data transmission control unit 8 receives the address setting process identification signal, the storage unit 8A retrieves the address setting data (referred to as the address setting data D2) from the storage unit 8A, and outputs the address setting data D2 by the time t3 (refer to the period of time B in FIG. 6). At the time t3, the transmission reception unit 9 starts receiving the address setting data D2 output from the address setting data transmission control unit 8, and completes transmitting the address setting data D2 to the apparatus IC2 by the time t4 during the period of time C (D2).

In the first embodiment, as described above, the address setting data output from the address setting data transmission control unit 8 includes, for example, the address setting command and the reliability check data of the address setting command (Cyclic Redundancy Check, CRC). The address setting command may be integrally formed of, for example, the information indicating that the address setting command is the command for setting the address and the address addition instruction, that is, the instruction for adding the specific value to the address. In the first embodiment, it is supposed that the specific value is set to "1", and the specific value is not limited thereto.

In step S5, when the reliability check unit 5B determines that the reliability of the address setting data D1 does not satisfy the standard in step S0, the address setting data D1 thus received are discarded. In step S6, when the transmission reception unit 5 determines that the address setting data D1 thus received from the control unit 2 are not the address setting data in step S1, the transmission reception unit 5 distributes the data thus received to other unit other than the address setting unit 7. In step S7, when the command determining unit 7A determines that the address setting data D1 thus received are not the address setting data, the command determining unit 7A performs the address initial value setting process or other process.

In the first embodiment, as described above, when the data reception transfer unit 5A of the apparatus IC1 starts receiving the address setting data D1 at the time t1, the data reception transfer unit 5A distributes the address setting data D1 per bit to the address setting unit 7. At the same time, the data reception transfer unit 5A outputs the address setting data D1 per bit to the transmission reception unit 9. Accordingly, the transmission reception unit 9 starts receiving the address setting data D1 at the time t1, and completes transmitting the address setting data D1 to the apparatus IC2 by the time t2 for the period of time C (D1).

In the first embodiment, at the time t1 in FIG. 6, in the apparatus IC2, the data reception transfer unit 5A starts receiving the address setting data D1. At the same time, the data reception transfer unit 5A starts transmitting the address setting data D1 to the reliability check unit 5B per bit. By the time t2, the reliability check unit 5B completes receiving the address setting data D1 during the period of time A (D1).

In the first embodiment, after the reliability check unit 5B completes receiving the address setting data D1 as the packet, the reliability check unit 5B determines whether the reliability of the address setting data D1 satisfies the standard. When the reliability check unit 5B determines that the reliability of the address setting data D1 satisfies the standard, similar to the apparatus IC1, the address setting unit 7 adds "1" to the address of the apparatus IC2 according to the address setting command of the address setting data D1, so that the address of the apparatus IC2 becomes "1".

In the first embodiment, in the address setting data transmission control unit 8, the storage unit 8A retrieves the address setting data (referred to as the address setting data D3) from the storage unit 8A, and outputs the address setting data D3 by the time t3 for the period of time B. At the time t3, the transmission reception unit 9 starts receiving the address setting data D3 output from the address setting data transmission control unit 8, and completes transmitting the address setting data D3 to the apparatus IC3 by the time t4 during the period of time C (D3).

In the first embodiment, as described above, when the data reception transfer unit 5A of the apparatus IC2 starts receiving the address setting data D1 at the time t1, the data reception transfer unit 5A distributes the address setting data D1 per bit to the address setting unit 7 after the specific process is completed. At the same time, the data reception transfer unit 5A outputs the address setting data D1 per bit to the transmission reception unit 9. Accordingly, the transmission reception unit 9 starts receiving the address setting data D1 at the time t1, and completes transmitting the address setting data D1 to the apparatus IC3 by the time t2 for the period of time C (D1).

In the first embodiment, at the time t3 in FIG. 6, in the apparatus IC2, the data reception transfer unit 5A starts receiving the address setting data D2 generated in the apparatus IC1. At the same time, the data reception transfer unit 5A starts transmitting the address setting data D2 to the reliability check unit 5B per bit. By the time t4, the reliability check unit 5B completes receiving the address setting data D2 during the period of time A (D2).

In the first embodiment, after the reliability check unit 5B completes receiving the address setting data D2 as the packet, the reliability check unit 5B determines whether the reliability of the address setting data D2 satisfies the standard. When the reliability check unit 5B determines that the reliability of the address setting data D2 satisfies the standard, similar to the apparatus IC1, the address setting unit 7 adds "1" to the address of the apparatus IC2 according to the address setting command of the address setting data D1, so that the address of the apparatus IC2 becomes "2".

In the first embodiment, in the address setting data transmission control unit 8, the storage unit 8A retrieves the address setting data (referred to as the address setting data D4) from the storage unit 8A, and outputs the address setting data D4 by the time t5 for the period of time B. At the time t5, the transmission reception unit 9 starts receiving the address setting data D4 output from the address setting data transmission control unit 8, and completes transmitting the address setting data D4 to the apparatus IC3 by the time t6 during the period of time C (D4).

In the first embodiment, as described above, when the data reception transfer unit 5A of the apparatus IC2 starts receiving the address setting data D2 at the time t3, the data reception transfer unit 5A distributes the address setting data D2 per bit to the address setting unit 7 after the specific process is completed. At the same time, the data reception transfer unit 5A outputs the address setting data D2 per bit to the transmission reception unit 9. As described above, the transmission reception unit 9 receives the address setting data D2 at the time t3.

In the first embodiment, through the process described above, the address setting data D1, the address setting data D3, and the address setting data D4 are transmitted from the apparatus IC2 to the apparatus IC3. It should be noted that, as shown in FIG. 6, the address setting data D2 are not transmitted to the apparatus IC3. This is because the transmission reception unit 9 is configured to preferentially process the data input from the second terminal relative to the data input from the first terminal.

More specifically, in the first embodiment, the address setting data D2 and the address setting data D3 reach the transmission reception unit 9 of the apparatus IC2 at the time t3. At this moment, the address setting data D2 output from the transmission reception unit 5 are input into the first terminal of the transmission reception unit 9, and the address setting data D3 output from the address setting data transmission control unit 8 are input into the second terminal of the transmission reception unit 9. Accordingly, the transmission reception unit 9 preferentially processes the address setting data D3 input from the second terminal, and the address setting data D2 input from the first terminal are discarded. As a result, the address setting data D2 are not transmitted to the apparatus IC3.

In the first embodiment, as described above, the data reception transfer unit 5A of the apparatus IC3 starts receiving the address setting data D1 at the time t1. At the same time, the data reception transfer unit 5A starts transferring the address setting data D1 to the reliability check unit 5B per bit. By the time t2, the reliability check unit 5B completes receiving the address setting data D1 during the period of time A (D1).

In the first embodiment, after the reliability check unit 5B completes receiving the address setting data D1 as the packet, the reliability check unit 5B determines whether the reliability of the address setting data D1 satisfies the standard. When the reliability check unit 5B determines that the reliability of the address setting data D1 satisfies the standard, similar to the apparatus IC1, the address setting unit 7 adds "1" to the address of the apparatus IC3 according to the address setting command of the address setting data D1, so that the address of the apparatus IC3 becomes "1".

In the first embodiment, in the address setting data transmission control unit 8, the storage unit 8A retrieves the address setting data (referred to as the address setting data D5) from the storage unit 8A, and outputs the address setting data D5 by the time t4 for the period of time B. At the time t5, the transmission reception unit 9 starts receiving the address setting data D5 output from the address setting data transmission control unit 8, and completes transmitting the address setting data D5 to the apparatus IC4 by the time t6 during the period of time C (D5).

In the first embodiment, as described above, when the data reception transfer unit 5A of the apparatus IC2 starts receiving the address setting data D2 at the time t3, the data reception transfer unit 5A distributes the address setting data D2 per bit to the address setting unit 7 after the specific process is performed. At the same time, the data reception transfer unit 5A outputs the address setting data D2 per bit to the transmission reception unit 9. Accordingly, the transmission reception unit 9 starts receiving the address setting data D2 at the time t3.

In the first embodiment, through the process described above, the address setting data D1, the address setting data D3, and the address setting data D4 are transmitted from the apparatus IC2 to the apparatus IC3. It should be noted that, as shown in FIG. 6, the address setting data D2 are not transmitted to the apparatus IC3. This is because the transmission reception unit 9 is configured to preferentially process the data input from the second terminal relative to the data input from the first terminal.

More specifically, in the first embodiment, the address setting data D2 and the address setting data D3 reach the transmission reception unit 9 of the apparatus IC2 at the time t3. At this moment, the address setting data D2 output from the transmission reception unit 5 are input into the first terminal of the transmission reception unit 9, and the address setting data D3 output from the address setting data transmission control unit 8 are input into the second terminal of the transmission reception unit 9. Accordingly, the transmission reception unit 9 preferentially processes the address setting data D3 input from the second terminal, and the address setting data D2 input from the first terminal are discarded. As a result, the address setting data D2 are not transmitted to the apparatus IC3.

In the first embodiment, at the time t1 in FIG. 6, in the apparatus IC3, the data reception transfer unit 5A starts receiving the address setting data D1. At the same time, the data reception transfer unit 5A starts transmitting the address setting data D1 to the reliability check unit 5B per bit. By the time t2, the reliability check unit 5B completes receiving the address setting data D1 during the period of time A (D1).

In the first embodiment, after the reliability check unit 5B completes receiving the address setting data D1 as the packet, the reliability check unit 5B determines whether the reliability of the address setting data D1 satisfies the standard. When the reliability check unit 5B determines that the reliability of the address setting data D1 satisfies the standard, similar to the apparatus IC1, the address setting unit 7 adds "1" to the address of the apparatus IC3 according to the address setting data D1, so that the address of the apparatus IC3 becomes "1".

In the first embodiment, in the address setting data transmission control unit 8, the storage unit 8A retrieves the address setting data (referred to as the address setting data D5) from the storage unit 8A, and outputs the address setting data D5 by the time t3. At the time t3, the transmission reception unit 9 starts receiving the address setting data D5 output from the address setting data transmission control unit 8, and completes transmitting the address setting data D5 to the apparatus IC4 by the time t4 during the period of time C (D5).

In the first embodiment, as described above, when the data reception transfer unit 5A of the apparatus IC3 starts receiving the address setting data D1 at the time t1, the data reception transfer unit 5A distributes the address setting data D1 per bit to the address setting unit 7. At the same time, the data reception transfer unit 5A outputs the address setting data D1 per bit to the transmission reception unit 9. Accordingly, the transmission reception unit 9 starts receiving the address setting data D1 at the time t1, and completes transmitting the address setting data D1 to the apparatus IC4 by the time t2 for the period of time C (D1).

In the first embodiment, at the time t3 in FIG. 6, in the apparatus IC3, the data reception transfer unit 5A starts receiving the address setting data D3 generated in the apparatus IC2. At the same time, the data reception transfer unit 5A starts transmitting the address setting data D3 to the reliability check unit 5B per bit. By the time t4, the reliability check unit 5B completes receiving the address setting data D3 during the period of time A (D3).

In the first embodiment, after the reliability check unit 5B completes receiving the address setting data D3 as the packet, the reliability check unit 5B determines whether the reliability of the address setting data D3 satisfies the standard. When the reliability check unit 5B determines that the reliability of the address setting data D3 satisfies the standard, similar to the apparatus IC1, the address setting unit 7 adds "1" to the address of the apparatus IC3 according to the address setting command of the address setting data D3, so that the address of the apparatus IC3 becomes "2".

In the first embodiment, in the address setting data transmission control unit 8, the storage unit 8A retrieves the address setting data (referred to as the address setting data D6) from the storage unit 8A, and outputs the address setting data D6 by the time t5 for the period of time B. At the time t5, the transmission reception unit 9 starts receiving the address setting data D6 output from the address setting data transmission control unit 8, and completes transmitting the address setting data D6 to the apparatus IC4 by the time t6 during the period of time C (D6).

In the first embodiment, as described above, when the data reception transfer unit 5A of the apparatus IC3 starts receiving the address setting data D3 at the time t3, the data reception transfer unit 5A distributes the address setting data D3 per bit to the address setting unit 7 after the specific process is completed. At the same time, the data reception transfer unit 5A outputs the address setting data D3 per bit to the transmission reception unit 9.

In the first embodiment, at the time t5 in FIG. 6, in the apparatus IC3, the data reception transfer unit 5A starts receiving the address setting data D4 generated in the apparatus IC2. At the same time, the data reception transfer unit 5A starts transmitting the address setting data D4 to the reliability check unit 5B per bit. By the time t6, the reliability check unit 5B completes receiving the address setting data D4 during the period of time A (D4).

In the first embodiment, after the reliability check unit 5B completes receiving the address setting data D4 as the packet, the reliability check unit 5B determines whether the reliability of the address setting data D4 satisfies the standard. When the reliability check unit 5B determines that the reliability of the address setting data D4 satisfies the standard, similar to the apparatus IC1, the address setting unit 7 adds "1" to the address of the apparatus IC3 according to the address setting command of the address setting data D4, so that the address of the apparatus IC3 becomes "3".

In the first embodiment, in the address setting data transmission control unit 8, the storage unit 8A retrieves the address setting data (referred to as the address setting data D7) from the storage unit 8A, and outputs the address setting data D7 by the time t7 for the period of time B. At the time t7, the transmission reception unit 9 starts receiving the address setting data D7 output from the address setting data transmission control unit 8, and completes transmitting the address setting data D7 to the apparatus IC4 by the time t8 during the period of time C (D7).

In the first embodiment, as described above, when the data reception transfer unit 5A of the apparatus IC3 starts receiving the address setting data D4 at the time t5, the data reception transfer unit 5A distributes the address setting data D4 per bit to the address setting unit 7 after the specific process is completed. At the same time, the data reception transfer unit 5A outputs the address setting data D4 per bit to the transmission reception unit 9.

In the first embodiment, through the process described above, the address setting data D1, the address setting data D5, the address setting data D6, and the address setting data D7 are transmitted from the apparatus IC3 to the apparatus IC4. It should be noted that, as shown in FIG. 6, the address setting data D3 and the address setting data D4 are not transmitted to the apparatus IC4. This is because the transmission reception unit 9 is configured to preferentially process the data input from the second terminal relative to the data input from the first terminal.

More specifically, in the first embodiment, the address setting data D3 and the address setting data D5 reach the transmission reception unit 9 of the apparatus IC3 at the time t3. At this moment, the address setting data D3 output from the transmission reception unit 5 are input into the first terminal of the transmission reception unit 9, and the address setting data D5 output from the address setting data transmission control unit 8 are input into the second terminal of the transmission reception unit 9. Accordingly, the transmission reception unit 9 preferentially processes the address setting data D5 input from the second terminal, and the address setting data D3 input from the first terminal are discarded. As a result, the address setting data D3 are not transmitted to the apparatus IC4.

Further, in the first embodiment, the address setting data D4 and the address setting data D6 reach the transmission reception unit 9 of the apparatus IC3 at the time t5. At this moment, the address setting data D4 output from the transmission reception unit 5 are input into the first terminal of the transmission reception unit 9, and the address setting data D6 output from the address setting data transmission control unit 8 are input into the second terminal of the transmission reception unit 9. Accordingly, the transmission reception unit 9 preferentially processes the address setting data D6 input from the second terminal, and the address setting data D4 input from the first terminal are discarded. As a result, the address setting data D4 are not transmitted to the apparatus IC4.

In the first embodiment, the apparatus IC4 is configured to receive the address setting data D1, the address setting data D5, the address setting data D6, and the address setting data D7 from the apparatus IC3. Accordingly, the address of the apparatus IC4 becomes "4".

In the first embodiment, when the process described above is repeated, it is possible for each of the apparatus IC1 to ICn to be able to set the address to itself different from that of other apparatus. Further, it may be configured such that a signal indicating that the address of the apparatus ICn is set is transmitted from the apparatus ICn to the control unit 2 through the communication line 3 and the communication line 4.

As described above, in the first embodiment, the address setting unit 7 is configured to set the specific value relative to the address of the apparatus where the address setting unit 7 is disposed. Further, the address setting data transmission control unit 8 is configured to output the address setting data to the apparatus at a later stage of the apparatus where the address setting data transmission control unit 8 is disposed, and the address setting data include the address addition instruction as the address setting command for adding the specific value determined in advance in the apparatus to the address of the apparatus. Accordingly, it is possible to set different addresses among the apparatus IC1 to ICn of the electrical device 1 without generating a new address in each of the apparatus IC1 to ICn of the electrical device 1.

Accordingly, in the first embodiment, when the data are transmitted for setting the address of each of the apparatus IC1 to ICn, it is not necessary to newly generate the reliability check data every time, thereby making it possible to prevent the period of time for setting the address from prolonging. Further, the electrical device 1 is capable of storing the reliability check data without depending on the memory capacity, so that it is possible to prevent the number of apparatus disposed in the electrical device 1 from being restricted due to the memory capacity.

In the conventional electric device, the communication is performed using data including at least an address setting command, an address number, and reliability check data thereof. On the other hand, in the first embodiment of the present invention, it is not necessary to provide the communication data with data defining the address number. Accordingly, it is possible to reduce the amount of the communication data, thereby making it possible to set the address to each of the apparatus IC1 to ICn at a faster speed.

Further, in the first embodiment, the transmission reception unit 9 includes the first terminal for inputting the data output from the transmission reception unit 5 and the second terminal for inputting the data output from the address setting data transmission control unit 8. When the data are input into the first terminal while the transmission reception unit 9 is processing the data input into the second terminal, the data input into the first terminal are discarded, so that the transmission reception unit 9 can preferentially process the data input into the second terminal. Accordingly, it is possible to set an identical absolute value to the difference in the addresses of the apparatus IC1 to ICn connected with each other.

Second Embodiment

A second embodiment of the present invention will be explained next with reference to FIGS. 1 and 7. In the second embodiment, the electrical device 1 has a configuration similar to that of the electrical device 1 in the first embodiment, except that the address setting unit 7 has a configuration different from that of the address setting unit 7 in the first embodiment. With the difference in the configuration of the address setting unit 7, the electrical device 1 performs a process of setting the address to each of the apparatus IC1 to ICn slightly different from that in the first embodiment. Components in the second embodiment similar to those in the first embodiment are designated with the same reference numerals, and explanations thereof are omitted.

Figure 7:
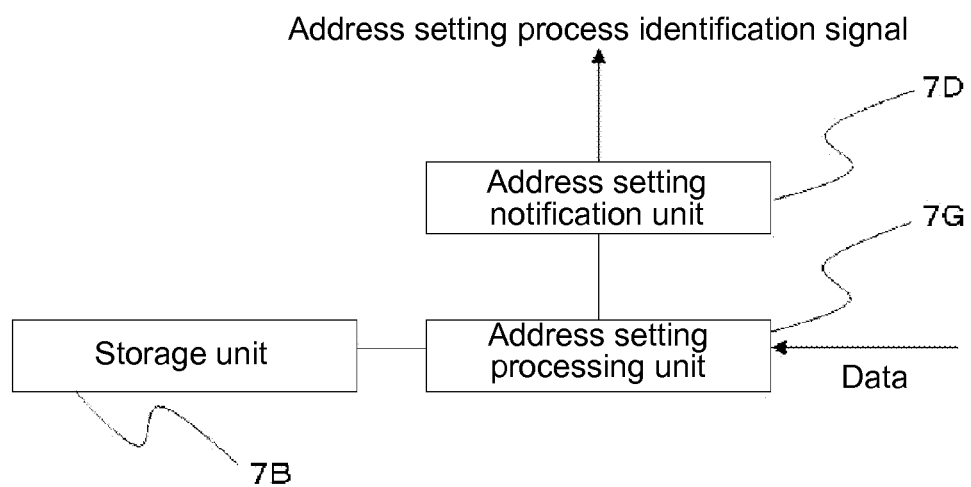
FIG. 7 is a block diagram showing a configuration of an address setting unit of each of apparatus of an electrical device according to a second embodiment of the present invention.

FIG. 7 a block diagram showing a configuration of the address setting unit 7 of each of the apparatus IC1 to ICn of the electrical device 1 according to the second embodiment of the present invention. As shown in FIG. 3, the address setting unit 7 includes the storage unit 7B; an address setting processing unit 7G; and the address setting notification unit 7D. Further, the address setting unit 7 is electrically connected to the transmission reception unit 5.

In the second embodiment, the address setting processing unit 7G is configured to set the address relative to the storage unit 7B according to the address setting command of the address setting data. When the address setting processing unit 7G sets the address in the storage unit 7B, the address setting processing unit 7G is configured to set the specific value relative to the storage unit 7B, or to add the specific value relative to the storage unit 7B.

An operation of the electrical device 1 in the address setting process relative to each of the apparatus IC1 to Icn will be explained next with reference to FIGS. 8 and 9.

Figure 8:
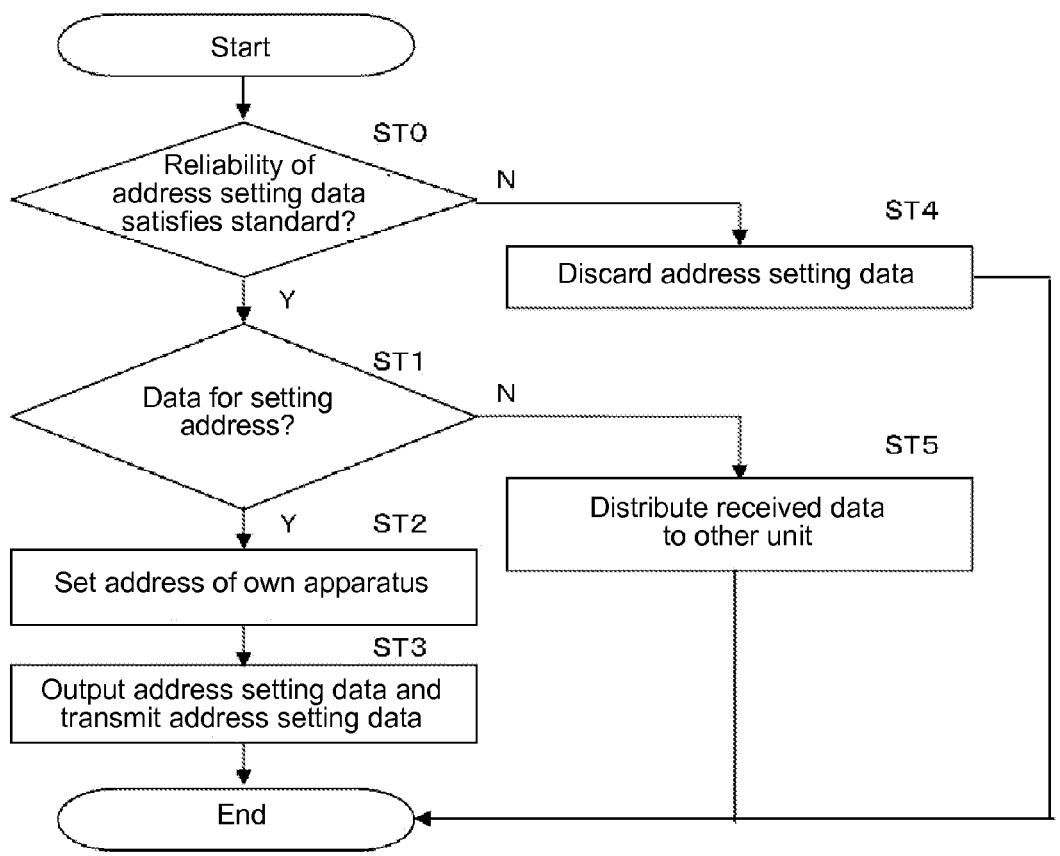
FIG. 8 is a block diagram showing a configuration of an address setting data transmission control unit of the apparatus of the electrical device according to the second embodiment of the present invention.

FIG. 8 is a flow chart showing the operation of the electrical device 1 when each of the apparatus IC1 to Icn performs the process of setting the address according to the second embodiment of the present invention. FIG. 9 is a time chart showing the operation of the electrical device 1 when each of the apparatus IC1 to Icn performs the process of setting the address according to the second embodiment of the present invention.

Figure 9:
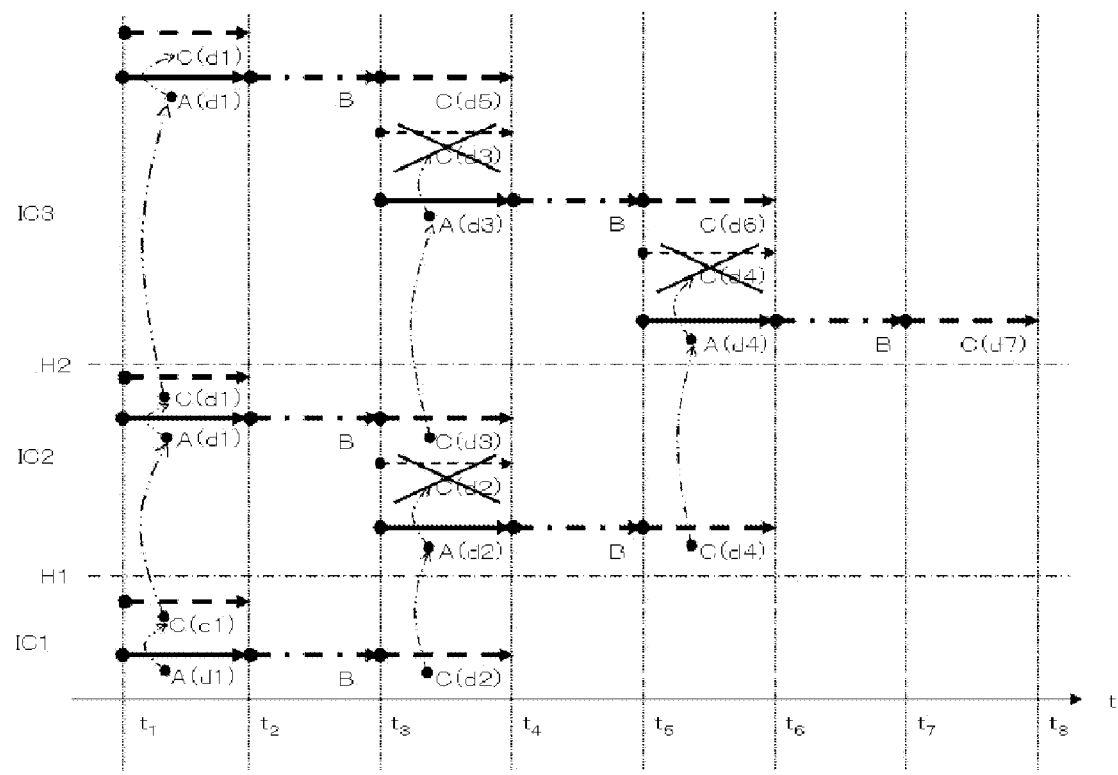
FIG. 9 is a time chart showing the operation of the electrical device when each of the apparatus performs the process of setting the address according to the second embodiment of the present invention.

In FIG. 9, A (dn), B, or C (dn) represents a period of time similar to the period of time A (Dn), B, or C (Dn) shown in FIG. 6 in the first embodiment, except "Dn" is replaced with "dn". Accordingly, detailed explanations thereof are omitted. Further, a solid line arrow, a projected line arrow, a hidden line arrow, a long hidden line, and a long double-dashed hidden line arrow indicate the same processes as those in FIG. 6, except "Dn" is replaced with "dn". Accordingly, detailed explanations thereof are omitted.

In the second embodiment, for the reason described in the first embodiment, when the data are received, it is supposed that the data reception transfer unit 5A starts receiving the data; the reliability check unit 5B starts receiving the data; the transmission reception unit 9 starts receiving the data; and the data reception transfer unit 5A of another apparatus at a later stage starts receiving the data simultaneously.

In the second embodiment, when the electrical device 1 is turned on to power up each unit thereof to be in an operable state, the control unit 2 transmits the address setting data to the apparatus IC1 through the communication line 4. The address setting data includes, for example, the address setting command and the reliability check data of the address setting command (Cyclic Redundancy Check, CRC). The address setting command may be integrally formed of, for example, information indicating that the address setting command is the command for setting the address and the address setting instruction, that is, the instruction for setting the specific value to the address. In the second embodiment, it is supposed that the specific value is set to "0", and the specific value is not limited thereto.

In the second embodiment, at the time t1 in FIG. 9, in the apparatus IC1, the data reception transfer unit 5A starts receiving the address setting data (referred to as the address setting data d1) generated with the control unit 2. At the same time, the data reception transfer unit 5A starts transmitting the address setting data d1 to the reliability check unit 5B per bit. By the time t2, the reliability check unit 5B completes receiving the address setting data d1 during the period of time A (d1).

As shown in the flow chart shown in FIG. 8, in step ST0, after the reliability check unit 5B completes receiving the address setting data d1 as the packet, the reliability check unit 5B determines whether the reliability of the address setting data d1 satisfies the standard. In step ST1, when the reliability check unit 5B determines that the reliability of the address setting data d1 satisfies the standard, the data type determining unit 5C determines whether the address setting data d1 are the data for setting the address. When the data type determining unit 5C determines that the address setting data d1 are the data for setting the address, the data type determining unit 5C transmits the address setting data d1 to the address setting unit 7.

In step ST2, when the address setting unit 7 receives the address setting data d1, the address setting processing unit 7G performs the process of adding the specific value to the address relative to the storage unit 7B. In this case, the address setting processing unit 7G sets "0" to the address according to the address setting command of the address setting data d1, so that the address of the apparatus IC1 becomes "0". Further, the address setting notification unit 7D outputs the information indicating that the address setting processing unit 7G sets the address in the storage unit 7B as the address setting process identification signal.

In step ST3, when the address setting data transmission control unit 8 receives the address setting process identification signal, the storage unit 8A retrieves the address setting data (referred to as the address setting data d2) from the storage unit 8A, and outputs the address setting data d2 by the time t3 (refer to the period of time B in FIG. 9). At the time t3, the transmission reception unit 9 starts receiving the address setting data d2 output from the address setting data transmission control unit 8, and completes transmitting the address setting data d2 to the apparatus IC2 by the time t4 during the period of time C (d2).

In the second embodiment, as described above, the address setting data output from the address setting data transmission control unit 8 includes, for example, the address setting command and the reliability check data of the address setting command (Cyclic Redundancy Check, CRC). The address setting command may be integrally formed of, for example, the information indicating that the address setting command is the command for setting the address and the address addition instruction, that is, the instruction for adding the specific value to the address. In the second embodiment, it is supposed that the specific value is set to "1", and the specific value is not limited thereto.

In step ST4, when the reliability check unit 5B determines that the reliability of the address setting data d1 received with the reliability check unit 5B from the control unit 2 does not satisfy the standard in step ST0, the address setting data d1 thus received are discarded. In step ST5, when the transmission reception unit 5 determines that the address setting data d1 thus received from the control unit 2 are not the address setting data in step ST1, the transmission reception unit 5 distributes the data thus received to other unit other than the address setting unit 7.

In the second embodiment, as described above, when the data reception transfer unit 5A of the apparatus IC1 starts receiving the address setting data d1 at the time t1, the data reception transfer unit 5A distributes the address setting data d1 per bit to the address setting unit 7. At the same time, the data reception transfer unit 5A outputs the address setting data d1 per bit to the transmission reception unit 9. Accordingly, the transmission reception unit 9 starts receiving the address setting data d1 at the time t1, and completes transmitting the address setting data d1 to the apparatus IC2 by the time t2 for the period of time C (d1).

In the second embodiment, at the time t1 in FIG. 9, in the apparatus IC2, the data reception transfer unit 5A starts receiving the address setting data d1. At the same time, the data reception transfer unit 5A starts transmitting the address setting data d1 to the reliability check unit 5B per bit. By the time t2, the reliability check unit 5B completes receiving the address setting data d1 during the period of time A (d1).

In the second embodiment, after the reliability check unit 5B completes receiving the address setting data d1 as the packet, the reliability check unit 5B determines whether the reliability of the address setting data d1 satisfies the standard. When the reliability check unit 5B determines that the reliability of the address setting data d1 satisfies the standard, similar to the apparatus IC1, the address setting unit 7 sets "1" to the address of the apparatus IC2 according to the address setting command of the address setting data d1, so that the address of the apparatus IC2 becomes "0".

In the second embodiment, in the address setting data transmission control unit 8, the storage unit 8A retrieves the address setting data (referred to as the address setting data d3) from the storage unit 8A, and outputs the address setting data d3 by the time t3 for the period of time B. At the time t3, the transmission reception unit 9 starts receiving the address setting data d3 output from the address setting data transmission control unit 8, and completes transmitting the address setting data d3 to the apparatus IC3 by the time t4 during the period of time C (d3).

In the second embodiment, as described above, when the data reception transfer unit 5A of the apparatus IC2 starts receiving the address setting data d1 at the time t1, the data reception transfer unit 5A distributes the address setting data d1 per bit to the address setting unit 7 after the specific process is completed. At the same time, the data reception transfer unit 5A outputs the address setting data d1 per bit to the transmission reception unit 9. Accordingly, the transmission reception unit 9 starts receiving the address setting data d1 at the time t1, and completes transmitting the address setting data d1 to the apparatus IC3 by the time t2 for the period of time C (d1).

In the second embodiment, at the time t3 in FIG. 9, in the apparatus IC2, the data reception transfer unit 5A starts receiving the address setting data d2 generated in the apparatus IC1. At the same time, the data reception transfer unit 5A starts transmitting the address setting data d2 to the reliability check unit 5B per bit. By the time t4, the reliability check unit 5B completes receiving the address setting data d2 during the period of time C (D2).

In the second embodiment, after the reliability check unit 5B completes receiving the address setting data d2 as the packet, the reliability check unit 5B determines whether the reliability of the address setting data d2 satisfies the standard. When the reliability check unit 5B determines that the reliability of the address setting data d2 satisfies the standard, similar to the apparatus IC1, the address setting unit 7 adds "1" to the address of the apparatus IC2 according to the address setting command of the address setting data d2, so that the address of the apparatus IC2 becomes "1".

In the second embodiment, in the address setting data transmission control unit 8, the storage unit 8A retrieves the address setting data (referred to as the address setting data d4) from the storage unit 8A, and outputs the address setting data d4 by the time t5 for the period of time B. At the time t5, the transmission reception unit 9 starts receiving the address setting data d4 output from the address setting data transmission control unit 8, and completes transmitting the address setting data d4 to the apparatus IC3 by the time t6 during the period of time C (d4).

In the second embodiment, as described above, when the data reception transfer unit 5A of the apparatus IC2 starts receiving the address setting data d2 at the time t3, the data reception transfer unit 5A distributes the address setting data d2 per bit to the address setting unit 7 after the specific process is completed. At the same time, the data reception transfer unit 5A outputs the address setting data d2 per bit to the transmission reception unit 9. As described above, the transmission reception unit 9 receives the address setting data d2 at the time t3.

In the second embodiment, through the process described above, the address setting data d1, the address setting data d3, and the address setting data d4 are transmitted from the apparatus IC2 to the apparatus IC3. It should be noted that, as shown in FIG. 9, the address setting data d2 are not transmitted to the apparatus IC3. This is because the transmission reception unit 9 is configured to preferentially process the data input from the second terminal relative to the data input from the first terminal.

More specifically, in the second embodiment, the address setting data d2 and the address setting data d3 reach the transmission reception unit 9 of the apparatus IC2 at the time t3. At this moment, the address setting data d2 output from the transmission reception unit 5 are input into the first terminal of the transmission reception unit 9, and the address setting data d3 output from the address setting data transmission control unit 8 are input into the second terminal of the transmission reception unit 9. Accordingly, the transmission reception unit 9 preferentially processes the address setting data d3 input from the second terminal, and the address setting data d2 input from the first terminal are discarded. As a result, the address setting data d2 are not transmitted to the apparatus IC3.

In the second embodiment, as described above, the data reception transfer unit 5A of the apparatus IC3 starts receiving the address setting data d1 at the time t1. At the same time, the data reception transfer unit 5A starts transferring the address setting data d1 to the reliability check unit 5B per bit. By the time t2, the reliability check unit 5B completes receiving the address setting data d1 during the period of time A (d1).

In the second embodiment, after the reliability check unit 5B completes receiving the address setting data d1 as the packet, the reliability check unit 5B determines whether the reliability of the address setting data d1 satisfies the standard. When the reliability check unit 5B determines that the reliability of the address setting data d1 satisfies the standard, similar to the apparatus IC1, the address setting unit 7 sets "0" to the address of the apparatus IC3 according to the address setting command of the address setting data d1, so that the address of the apparatus IC3 becomes "0".

In the second embodiment, in the address setting data transmission control unit 8, the storage unit 8A retrieves the address setting data (referred to as the address setting data d5) from the storage unit 8A, and outputs the address setting data d5 by the time t5 for the period of time B. At the time t3, the transmission reception unit 9 starts receiving the address setting data d5 output from the address setting data transmission control unit 8, and completes transmitting the address setting data d5 to the apparatus IC4 by the time t4 during the period of time C (d5).

In the second embodiment, as described above, when the data reception transfer unit 5A of the apparatus IC3 starts receiving the address setting data d1 at the time t1, the data reception transfer unit 5A distributes the address setting data d1 per bit to the address setting unit 7 after the specific process is performed. At the same time, the data reception transfer unit 5A outputs the address setting data d1 per bit to the transmission reception unit 9. Accordingly, the transmission reception unit 9 starts receiving the address setting data d1 at the time t1, and completes transmitting the address setting data d1 to the apparatus IC4 by the time t2 for the period of time C (d1).

In the second embodiment, at the time t3 in FIG. 9, in the apparatus IC3, the data reception transfer unit 5A starts receiving the address setting data d3 generated in the apparatus IC2. At the same time, the data reception transfer unit 5A starts transmitting the address setting data d3 to the reliability check unit 5B per bit. By the time t4, the reliability check unit 5B completes receiving the address setting data d3 during the period of time A (d3).

In the second embodiment, after the reliability check unit 5B completes receiving the address setting data d3 as the packet, the reliability check unit 5B determines whether the reliability of the address setting data d3 satisfies the standard. When the reliability check unit 5B determines that the reliability of the address setting data d3 satisfies the standard, similar to the apparatus IC2, the address setting unit 7 adds "1" to the address of the apparatus IC3 according to the address setting command of the address setting data d3, so that the address of the apparatus IC3 becomes "1".

In the second embodiment, in the address setting data transmission control unit 8, the storage unit 8A retrieves the address setting data (referred to as the address setting data d6) from the storage unit 8A, and outputs the address setting data d6 by the time t5 for the period of time B. At the time t5, the transmission reception unit 9 starts receiving the address setting data d6 output from the address setting data transmission control unit 8, and completes transmitting the address setting data d6 to the apparatus IC4 by the time t6 during the period of time C (d6).

In the second embodiment, as described above, when the data reception transfer unit 5A of the apparatus IC3 starts receiving the address setting data d3 at the time t3, the data reception transfer unit 5A distributes the address setting data d3 per bit to the address setting unit 7 after the specific process is completed. At the same time, the data reception transfer unit 5A outputs the address setting data d3 per bit to the transmission reception unit 9.

In the second embodiment, at the time t5 in FIG. 9, in the apparatus IC3, the data reception transfer unit 5A starts receiving the address setting data d4 generated in the apparatus IC2. At the same time, the data reception transfer unit 5A starts transmitting the address setting data d4 to the reliability check unit 5B per bit. By the time t6, the reliability check unit 5B completes receiving the address setting data d4 during the period of time A (d4).

In the second embodiment, after the reliability check unit 5B completes receiving the address setting data d4 as the packet, the reliability check unit 5B determines whether the reliability of the address setting data d4 satisfies the standard. When the reliability check unit 5B determines that the reliability of the address setting data d4 satisfies the standard, similar to the apparatus IC1, the address setting unit 7 adds "1" to the address of the apparatus IC3 according to the address setting command of the address setting data d4, so that the address of the apparatus IC3 becomes "2".

In the second embodiment, in the address setting data transmission control unit 8, the storage unit 8A retrieves the address setting data (referred to as the address setting data d7) from the storage unit 8A, and outputs the address setting data d7 by the time t7 for the period of time B. At the time t7, the transmission reception unit 9 starts receiving the address setting data d7 output from the address setting data transmission control unit 8, and completes transmitting the address setting data d7 to the apparatus IC4 by the time t8 during the period of time C (d7).

In the second embodiment, as described above, when the data reception transfer unit 5A of the apparatus IC3 starts receiving the address setting data d4 at the time t7, the data reception transfer unit 5A distributes the address setting data d4 per bit to the address setting unit 7 after the specific process is completed. At the same time, the data reception transfer unit 5A outputs the address setting data d4 per bit to the transmission reception unit 9.

In the second embodiment, through the process described above, the address setting data d1, the address setting data d5, the address setting data d6, and the address setting data d7 are transmitted from the apparatus IC3 to the apparatus IC4. It should be noted that, as shown in FIG. 9, the address setting data d3 and the address setting data d4 are not transmitted to the apparatus IC4. This is because the transmission reception unit 9 is configured to preferentially process the data input from the second terminal relative to the data input from the first terminal.

More specifically, in the second embodiment, the address setting data d3 and the address setting data d5 reach the transmission reception unit 9 of the apparatus IC3 at the time t3. At this moment, the address setting data d3 output from the transmission reception unit 5 are input into the first terminal of the transmission reception unit 9, and the address setting data d5 output from the address setting data transmission control unit 8 are input into the second terminal of the transmission reception unit 9. Accordingly, the transmission reception unit 9 preferentially processes the address setting data d5 input from the second terminal, and the address setting data d3 input from the first terminal are discarded. As a result, the address setting data d3 are not transmitted to the apparatus IC4.

Further, in the second embodiment, the address setting data d4 and the address setting data d6 reach the transmission reception unit 9 of the apparatus IC3 at the time t5. At this moment, the address setting data d4 output from the transmission reception unit 5 are input into the first terminal of the transmission reception unit 9, and the address setting data d6 output from the address setting data transmission control unit 8 are input into the second terminal of the transmission reception unit 9. Accordingly, the transmission reception unit 9 preferentially processes the address setting data d6 input from the second terminal, and the address setting data d4 input from the first terminal are discarded. As a result, the address setting data d4 are not transmitted to the apparatus IC4.

In the second embodiment, the apparatus IC4 is configured to receive the address setting data d1, the address setting data d5, the address setting data d6, and the address setting data d7 from the apparatus IC3. Accordingly, the address of the apparatus IC4 becomes "3".

In the second embodiment, when the process described above is repeated, it is possible for each of the apparatus IC1 to ICn to be able to set the address to itself different from that of other apparatus. Further, it may be configured such that a signal indicating that the address of the apparatus ICn is set is transmitted from the apparatus ICn to the control unit 2 through the communication line 3 and the communication line 4.

As described above, in the second embodiment, the address setting unit 7 is configured to set the specific value relative to the address of the apparatus where the address setting unit 7 is disposed. Further, the address setting data transmission control unit 8 is configured to output the address setting data to the apparatus at a later stage of the apparatus where the address setting data transmission control unit 8 is disposed, and the address setting data include the address addition instruction as the address setting command for adding the specific value determined in advance in the apparatus to the address of the apparatus. Accordingly, it is possible to set different addresses among the apparatus IC1 to ICn of the electrical device 1 without generating a new address in each of the apparatus IC1 to ICn of the electrical device 1.

Accordingly, in the second embodiment, when the data are transmitted for setting the address of each of the apparatus IC1 to ICn, it is not necessary to newly generate the reliability check data every time, thereby making it possible to prevent the period of time for setting the address from prolonging. Further, the electrical device 1 is capable of storing the reliability check data without depending on the memory capacity, so that it is possible to prevent the number of apparatus disposed in the electrical device 1 from being restricted due to the memory capacity.

In the conventional electric device, the communication is performed using data including at least an address setting command, an address number, and reliability check data thereof. On the other hand, in the second embodiment of the present invention, it is not necessary to provide the communication data with data defining the address number. Accordingly, it is possible to reduce the amount of the communication data, thereby making it possible to set the address to each of the apparatus IC1 to ICn at a faster speed.

Further, in the second embodiment, the transmission reception unit 9 includes the first terminal for inputting the data output from the transmission reception unit 5 and the second terminal for inputting the data output from the address setting data transmission control unit 8. When the data are input into the first terminal while the transmission reception unit 9 is processing the data input into the second terminal, the data input into the first terminal are discarded, so that the transmission reception unit 9 can preferentially process the data input into the second terminal. Accordingly, it is possible to set an identical absolute value to the difference in the addresses of the apparatus IC1 to ICn connected with each other.

Further, in the second embodiment, it is possible to set the address to each of the apparatus IC1 to ICn without using the address initial value setting data. Accordingly, it is not necessary to provide the command determining unit 7A of the electrical device 1 in the first embodiment, thereby making it possible to set the address to each of the apparatus IC1 to ICn at a faster speed.

The disclosure of Japanese Patent Application No. 2012-194284, filed on Sep. 4, 2012, is incorporated in the application by reference.

While the invention has been explained with reference to the specific embodiments of the invention, the explanation is illustrative and the invention is limited only by the appended claims.

What is claimed is:

1. An electrical device configured to add reliability check data to communication data so that the electrical device performs data communication, comprising:
    a plurality of apparatus connected with a daisy chain connection through a communication line so that the apparatus communicate with each other through the communication line; and
    a control unit connected to the apparatus so that the control unit is configured to communicate with the apparatus,
    wherein one of said apparatus includes an address storage unit for storing an address of the one of the apparatus,
    said one of the apparatus includes an address setting unit for adding a specific number to the address of the one of the apparatus stored in the address storage unit to generate a new address of the one of the apparatus when the one of the apparatus receives an address addition instruction,
    said one of the said apparatus further includes an address setting data transmission control unit for transmitting the address addition instruction to a later stage apparatus when the address setting unit adds a specific value to the address of the one of the apparatus,
    said one of the apparatus further includes a first transmission reception unit for receiving first data and a second transmission reception unit for transmitting second data, and
    said second transmission reception unit includes a first terminal for receiving third data output from the first transmission reception unit and a second terminal for receiving fourth data output from the address setting data transmission control unit so that the fourth data are preferentially processed relative to the third data.

2. The electrical device according to claim 1, wherein said address setting unit is configured to add the specific number as the address of the one of the apparatus when the one of the apparatus receives an address setting instruction.

3. The electrical device according to claim 1, wherein said address setting unit is configured to set an initial value as the address of the one of the apparatus when the one of the apparatus receives an address setting instruction.

4. The electrical device according to claim 1, wherein said address setting unit is configured to output an address setting process identification signal when the address of the one of the apparatus is set, and
    said address setting data transmission control unit is configured to output the address addition instruction to the later stage apparatus when the address setting data transmission control unit receives the address setting process identification signal.

5. A method of setting an address to one of a plurality of apparatus connected with a daisy chain connection through a communication line so that the apparatus communicate with each other through the communication line, said apparatus being disposed in an electrical device including a control unit connected to the apparatus so that the control unit is configured to communicate with the apparatus, said method comprising the steps of:
verifying reliability of an address addition instruction according to reliability check data when the one of the apparatus receives the address addition instruction;
adding a specific number to the address of the one of the apparatus to generate a new address of the one of the apparatus when the address addition instruction satisfy a specific standard with respect to reliability; and
transmitting the address addition instruction to a later stage apparatus when a specific value is added to the address of the one of the apparatus,
wherein said one of the apparatus includes a first transmission reception unit for receiving first data and a second transmission reception unit for transmitting second data, and
said second transmission reception unit includes a first terminal for receiving third data output from the first transmission reception unit and a second terminal for receiving fourth data output from the address setting data transmission control unit so that the fourth data are preferentially processed relative to the third data.

6. The method of setting an address according to claim 5, further comprising the step of adding the specific number as the address of the one of the apparatus when the one of the apparatus receives an address setting instruction.

7. The method of setting an address according to claim 5, further comprising the step of setting an initial value as the address of the one of the apparatus when the one of the apparatus receives an address setting instruction.

8. An apparatus to be disposed in an electrical device, a plurality of said apparatus being connected with a daisy chain connection through a communication line so that the apparatus communicate with each other through the communication line, said electrical device including a control unit connected to the apparatus so that the control unit is configured to communicate with the apparatus, one of said apparatus comprising:
an address storage unit for storing an address of the one of the apparatus;
an address setting unit for adding a specific number to the address of the one of the apparatus stored in the address storage unit to generate a new address of the one of the apparatus when the one of the apparatus receives an address addition instruction; and
an address setting data transmission control unit for outputting the address addition instruction to a later stage apparatus when the address setting unit adds a specific value to the address of the one of the apparatus,
wherein said one of the apparatus further includes a first transmission reception unit for receiving first data and a second transmission reception unit for transmitting second data, and
said second transmission reception unit includes a first terminal for receiving third data output from the first transmission reception unit and a second terminal for receiving fourth data output from tho address getting data transmission control unit so that the fourth data are preferentially processed relative to the third data.

* * * * *